(12) United States Patent
Jones

(10) Patent No.: US 6,337,701 B1
(45) Date of Patent: Jan. 8, 2002

(54) APPARATUS FOR HARDWARE SUPPORT OF SOFTWARE COLOR CURSORS AND METHOD THEREFOR

(75) Inventor: Scott Thomas Jones, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/240,017

(22) Filed: Jan. 29, 1999

(51) Int. Cl.$^7$ .................................................. G06F 3/00
(52) U.S. Cl. ........................ 345/856; 345/600; 345/593; 345/683
(58) Field of Search ................................ 345/431, 150, 345/153, 339, 145, 334, 333, 435, 191, 199, 523, 524, 764, 856, 600, 589, 593, 595, 601, 549, 683, 765, 861, 859

(56) References Cited

U.S. PATENT DOCUMENTS

| | | | | |
|---|---|---|---|---|
| 4,354,184 A | * | 10/1982 | Woborschil | 345/145 |
| 4,454,507 A | * | 6/1984 | Srinivasan et al. | 345/145 |
| 4,566,000 A | * | 1/1986 | Goldman et al. | 345/145 |
| 4,625,202 A | * | 11/1986 | Richmond et al. | 345/145 |
| 4,668,947 A | * | 5/1987 | Clarke, Jr. et al. | 345/162 |
| 5,146,211 A | * | 9/1992 | Adams et al. | 345/145 |
| 5,790,111 A | * | 8/1998 | Wood et al. | 345/213 |
| 6,016,137 A | * | 1/2000 | Evans et al. | 345/145 |

\* cited by examiner

Primary Examiner—John Cabeca
Assistant Examiner—Kieu D. Vu
(74) Attorney, Agent, or Firm—Barry S. Newberger; Winstead Sechrest & Minick P.C.; Jeffrey S. LaBaw

(57) ABSTRACT

An apparatus and method for the hardware support of multicolor software cursors is provided. The data structures defining the software cursor are mapped into the buffer of a video device supporting a multicolor sprite. Each color region in the software cursor is identified via the data structures, and a corresponding data value loaded into the buffer in response thereto. The color of the pixels in each region is specified by loading a color data value representing the color, obtained from one of the data structures, into a register associated with the respective region.

24 Claims, 6 Drawing Sheets

APPARATUS FOR HARDWARE SUPPORT OF SOFTWARE COLOR CURSORS AND METHOD THEREFOR

TECHNICAL FIELD

The present invention relates in general to data processing systems, and in particular, to the video display of color cursors.

BACKGROUND INFORMATION

Cursors are commonly used in data processing systems employing a graphical user interface (GUI) to indicate the active point on the screen for a user input action, for example, as a mouse or track ball pointer. Cursors may be implemented either in software, or hardware. Most video devices support cursors generated using monochrome hardware "sprites." (The term sprite is common in the art for something that moves around on a video display screen in front of any other objects, and a hardware sprite is a video device for generating the sprite.)

Implementing a cursor as a hardware sprite is advantageous in that the graphic software does not need to draw the cursor on the screen, thereby saving central processing unit (CPU) cycles. A software cursor is literally drawn on the screen by the graphic software, requiring several block level transfers. The portion of the screen image at the location of the cursor is read and stored, then the cursor is drawn by applying two bitmasks, an "AND" bitmask and an "XOR" bitmask, and a color bitmap which is applied via an "OR" block level transfer. When the cursor is moved or the screen updated behind the cursor, the data stored corresponding to the video image at the previous position of the cursor is then used to restore that image. The read, draw, and write-to screen to restore operations are CPU cycle-intensive.

Moreover, these operations result in a cursor that flickers when displayed on a moving background, such as, a scrolling window. Because hardware sprites never need be removed from the screen to allow the background to be updated, a cursor generated as a hardware sprite does not flicker. Thus, cursors implemented as hardware sprites are advantageous, however, until recently, were only available to provide monochrome cursors. Multicolored cursors, that is, cursors having regions drawn in different colors, had to be implemented in software.

A new generation of video devices support multicolor sprites. These can be used to implement multicolored cursors in hardware. However, this necessitates operating system revisions to provide an applications program interface (API) to implement color cursors as a hardware sprite.

Alternatively, dynamically converting the software cursors to hardware cursors would permit the use of the multicolor sprites without the need to provide additional APIs, and would provide a platform independent mechanism for implementing color cursors. Thus, there is a need in the art for an apparatus and method for generating a multicolor cursor as a multicolor hardware sprite using a pre-existing software color cursor.

SUMMARY OF THE INVENTION

The aforementioned needs are addressed by the present invention. Accordingly, there is provided, in a first form, a method of hardware color cursor generation. The method includes accessing a preselected first data structure, and loading a predetermined first data value in a video device buffer in response to a first color data value in the first data structure.

There is also provided, in a second form, a data processing system having circuitry operable for accessing a preselected first data structure. The system also includes circuitry operable for loading a predetermined first data value in a video device buffer in response to a first color data value in the first data structure.

Additionally, there is provided, in a third form, a computer program product operable for storage on program storage media, the program product operable for hardware color cursor generation. The program product includes programming for accessing a preselected first data structure. Also included is programming for loading a predetermined first data value in a video device buffer in response to a first color data value in the first data structure.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
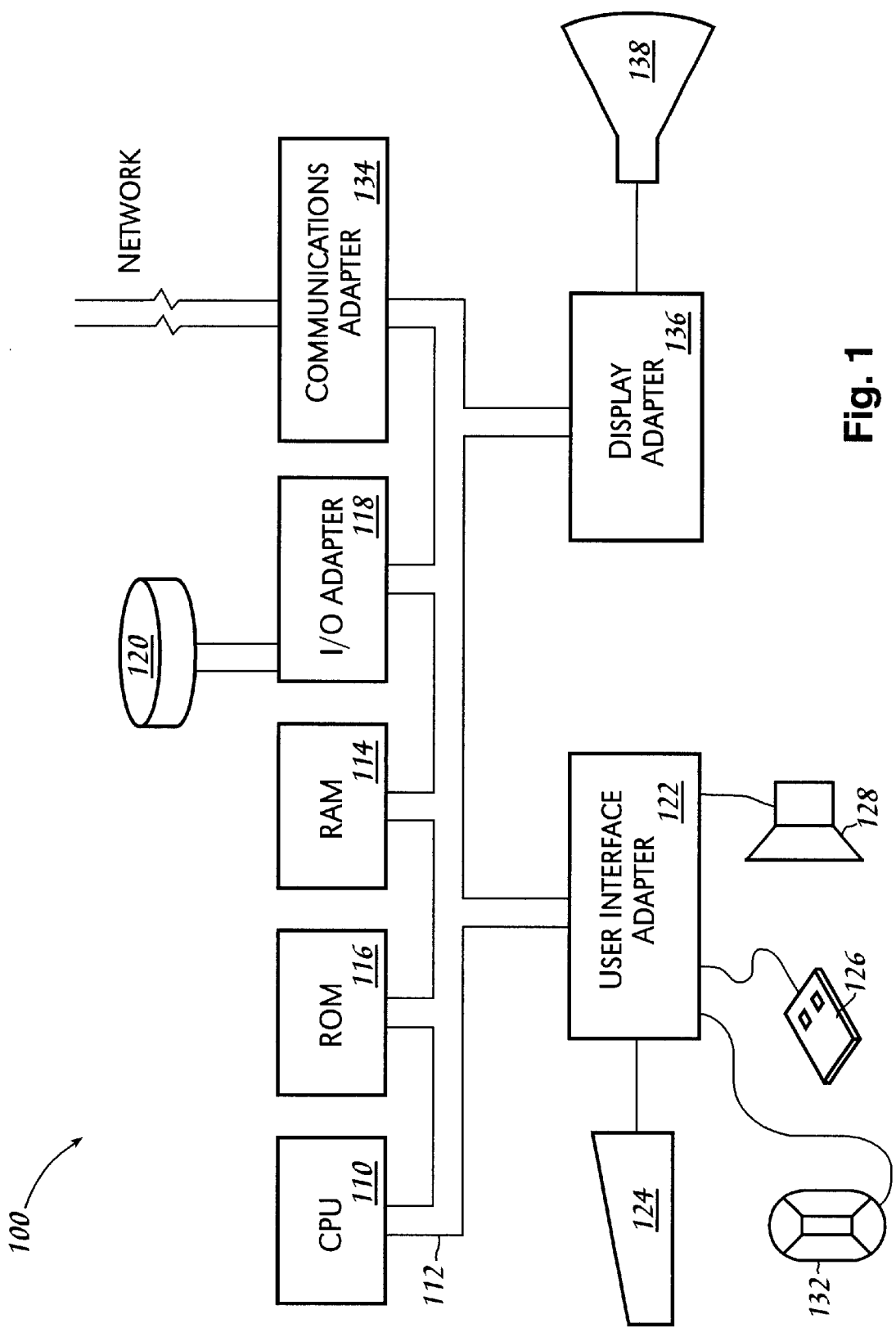
FIG. 1 illustrates, in block diagram form, a data processing system in accordance with an embodiment of the present invention.

A mechanism for generating multicolor cursors as multicolor hardware sprites is provided. The multicolor sprites are generated using the software color cursor definitions. The software bitmaps defining the color cursor in software are used to generate the data required by a video device supporting multicolor sprites in order to implement the hardware cursor. In this way, the pre-existing software color cursors defined in the operating system are used to implement the multicolor hardware cursors, without the need for providing additional APIs to interface with the hardware cursors.

In the following description, numerous specific details are set forth, such as, bitmap sizes or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, which is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, determining, or other terms that could be associated with a human operator. However, for at least a number of the operations described herein which form part of at least one of the embodiments, no action by a human operator is desirable. The operations described are, in large part, machine operations processing electrical signals to generate other electrical signals.

Multicolored cursors may typically be implemented in software using two bitmasks and a color bitmap. Each of the two bitmasks is represented by an M-by-N element array, or other data structure. These are typically one bit deep, however, other data values including a plurality of bits might be used and be within the spirit and scope of the present invention. Each element corresponds to one of the pixels forming the cursor.

Figure 2A:
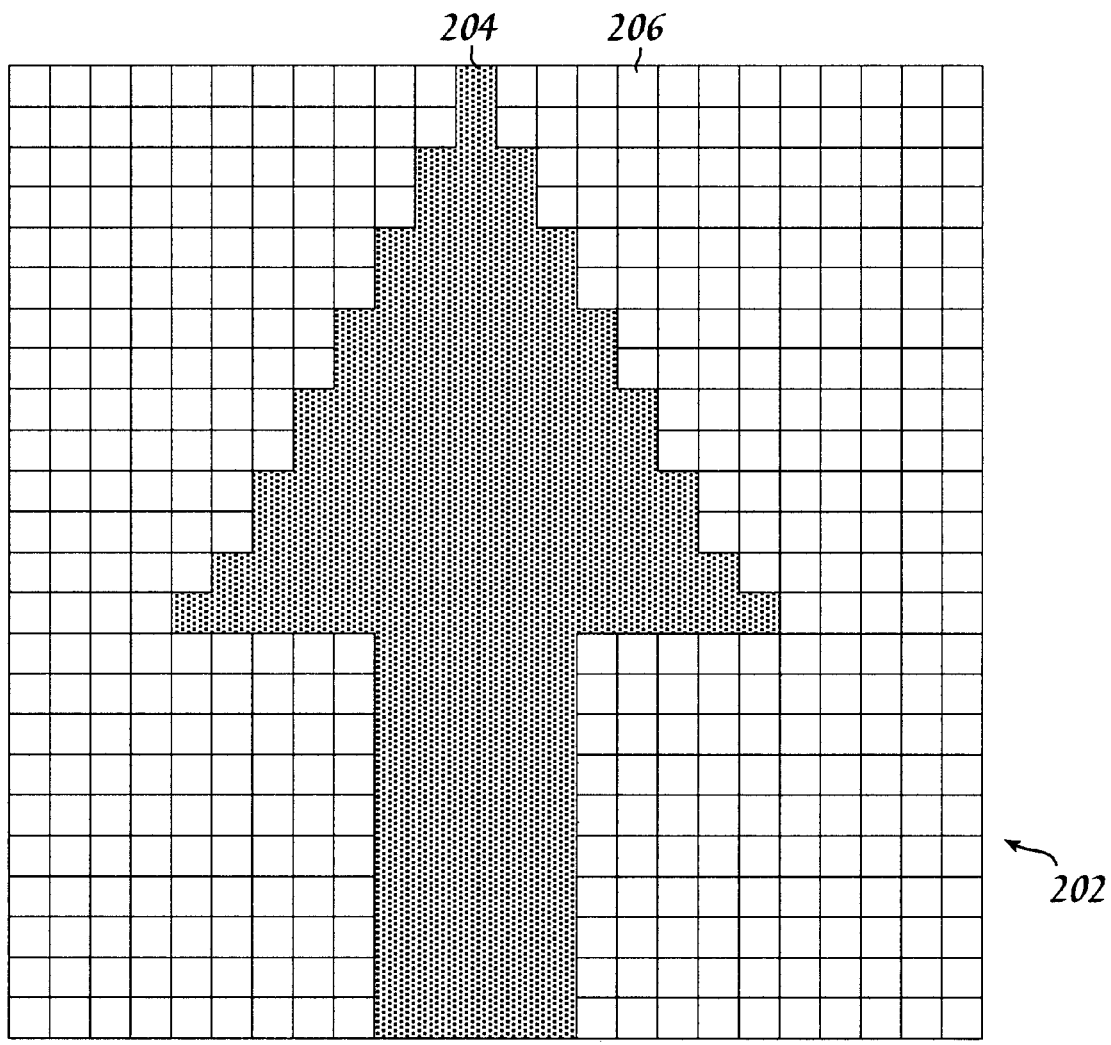
FIG. 2A illustrates an exemplary AND bitmap which may be used in an embodiment of the present invention.

A first bitmap is an "AND" bitmask that is used to mask out the background at the position the cursor is to be drawn. At the position of the cursor, the bits in the elements corresponding to the pixels constituting the cursor are asserted. An exemplary AND bitmask 202 is illustrated in FIG. 2A. Bitmask 202 is illustrated as a 24-by-24 bitmask, for simplicity. Cursors are, more commonly, implemented as 32-by-32 pixel graphics, however, it would be understood by one of ordinary skill in the art that a cursor may be implemented using any predetermined number of pixels. Exemplary AND bitmask 202 illustrates bitmask which might be used to draw an "arrowhead" cursor. Elements 204, illustrated as shaded in FIG. 2A, represent the pixels forming the cursor, and in which the bits are negated in the data structure corresponding to the bitmask. Elements 206 (equivalently, pixels) have bits which are asserted, whereby the background on the display device, such as, display 138 in FIG. 1, is drawn.

A second bitmask, used in generating the software colored cursor is an "XOR" bitmask. The XOR bitmask is also represented in memory, such as, RAM 114 in FIG. 1, as an M-by-N element array, or other data structure. Each element may typically be one bit deep, but, it would be understood by an artisan of ordinary skill that other, predetermined data values might be used. The elements of the data structure correspond to the pixels generating the cursor.

In the XOR bitmask, the data values are asserted in the elements corresponding to the pixels used to provide contrast for the outline of the cursor. For monochrome cursors only, the XOR bitmask is applied after the AND bitmask and provides the contrasting pixels within the black hole created by applying the AND bitmask and provides contrast by modifying the color of the background surrounding the black hole that will be created by the AND bitmask. Since the color bitmap can provide all the contrast needed within this black hole, the XOR bitmask is rarely used for color cursor and is usually entirely zero. Thus, in an embodiment of the present invention, the use of the XOR bitmask may be eliminated thereby increasing the number of unique colors in our new hardware sprite.

Figure 2B:
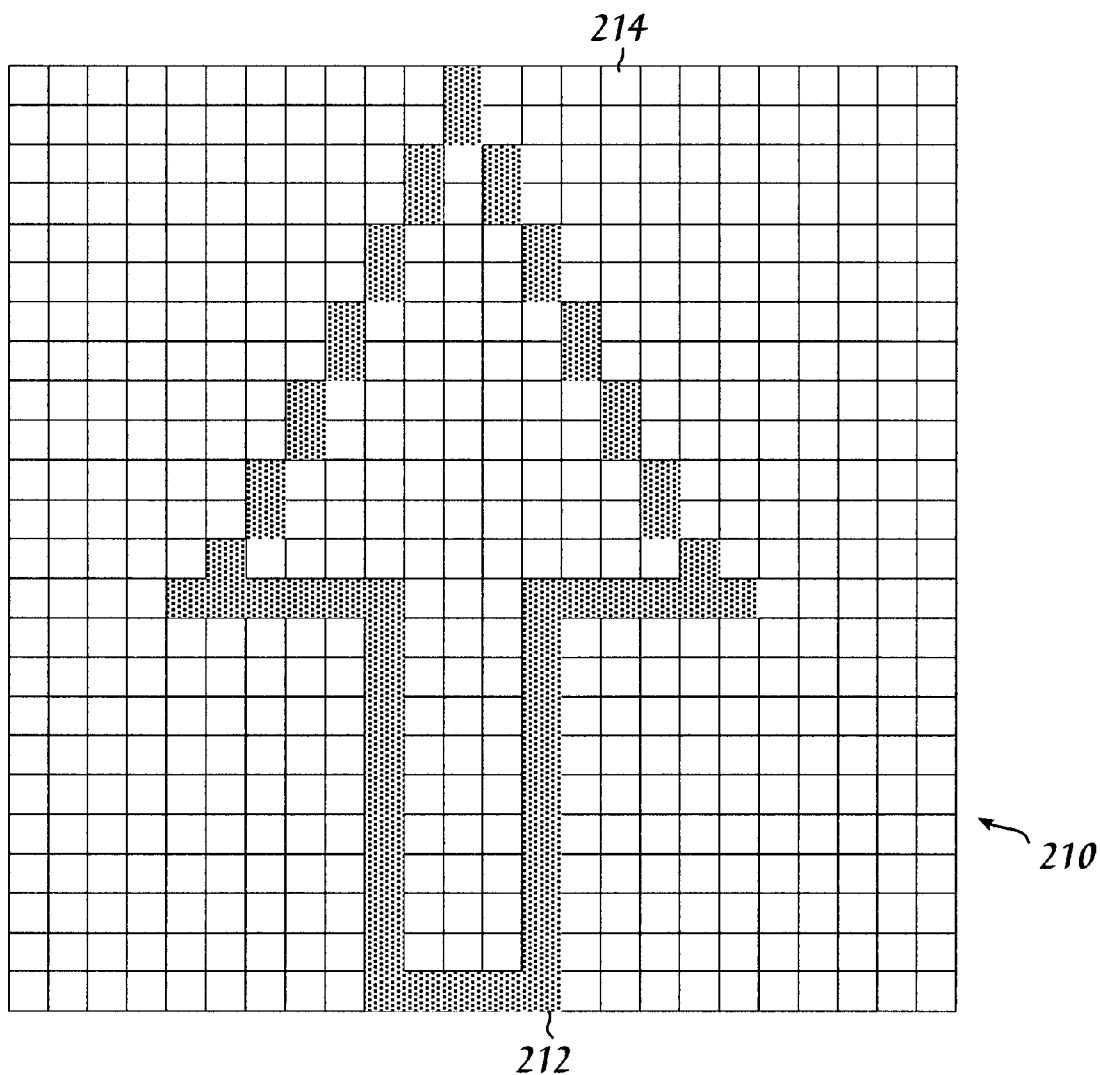
FIG. 2B illustrates an exemplary XOR bitmap which may be used in an embodiment of the present invention.

In FIG. 2B is illustrated an exemplary XOR bitmask 210 which might be used to generate an arrowhead cursor. Elements 212, shown shaded in FIG. 2B represent elements having asserted bits, corresponding to pixels forming the boundary of the cursor. Elements 214 represent elements in the data structure having negated bits. Exemplary bitmask 210 is illustrated as having 24-by-24 elements, for simplicity. Color cursors are more commonly 32-by-32 pixels, however, it would be understood by an artisan of ordinary skill that any predetermined number of pixels might be used, and the XOR bitmask would have a corresponding number of elements.

A third data structure constitutes a color bitmap. The data structure contains M-by-N elements, each of which includes a data value which may be P bits deep. The data value represents a color value, whereby the color cursor may have portions, or regions, each of which is one of 2P different colors. The elements of a color bitmap are commonly eight bits deep, whereby a color cursor may be represented with 256 different colors, however, it would be understood by an artisan of ordinary skill that other, predetermined, numbers of color data values may be used.

Figure 2C:
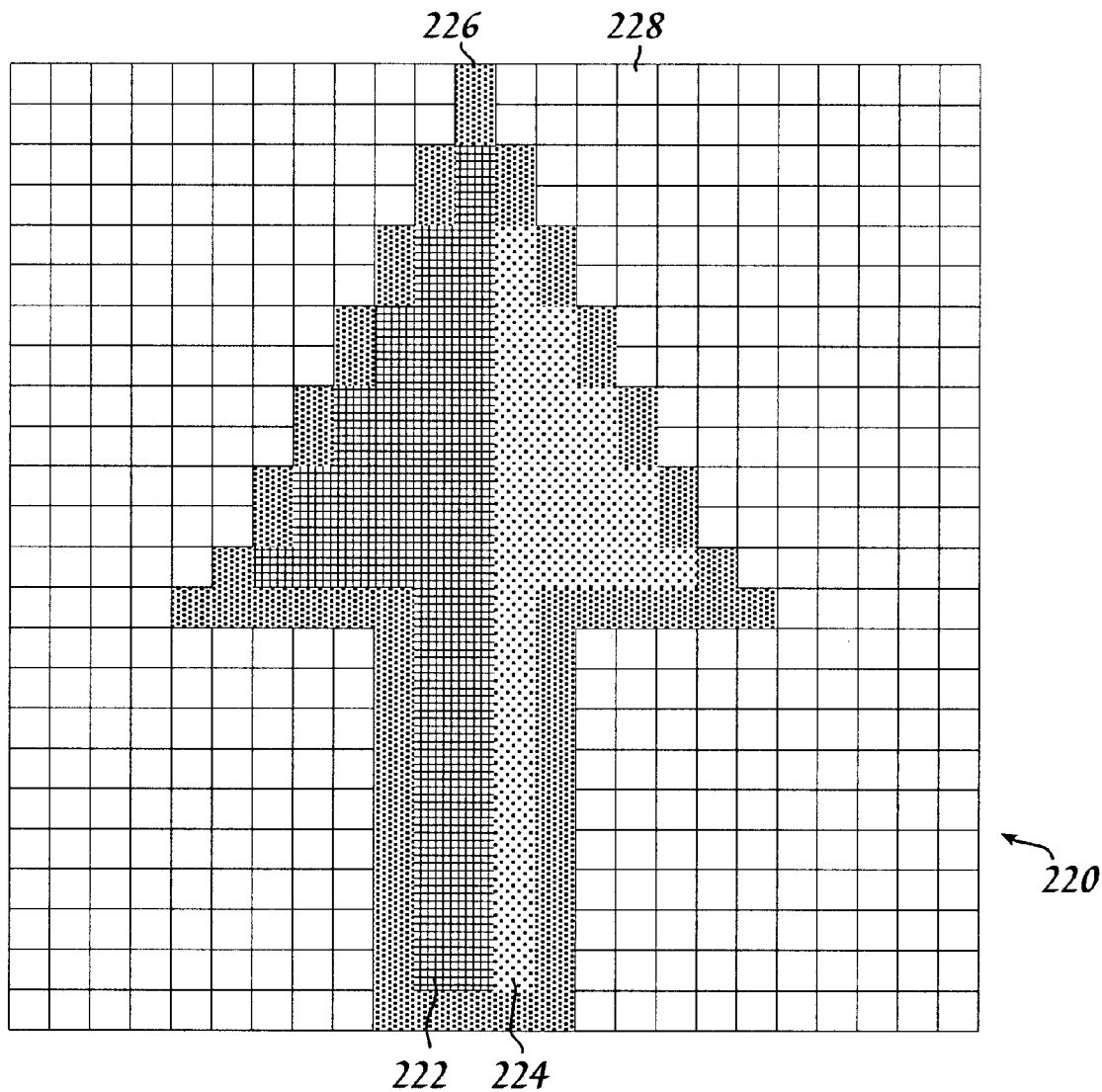
FIG. 2C illustrates an exemplary color bitmap which may be used with an embodiment of the present invention.

An exemplary color bitmap 220 is illustrated in FIG. 2C. Exemplary bitmap 220 might represent a four-color arrowhead cursor. A first color region is illustrated by crosshatched elements 222. These elements include a first color data value. A second color region is represented by elements 224, shown lightly shaded in FIG. 2C. These elements contain a second color data value. Elements 226, corresponding to pixels forming the boundary of the cursor, as previously discussed in conjunction with FIG. 2B, are shown heavily shaded in FIG. 2C. These elements will correspond to a third color region in the present invention, and will be discussed further in conjunction with FIG. 3. Elements 228 constitute a fourth color region, and, typically include a color data value corresponding to the background at the position of the color cursor on the display. Color bitmap 220 has been illustrated, for simplicity, as including 24-by-24 elements. However, it would be understood by one of ordinary skill in the art that color bitmap 220 may have any predetermined number of elements, and, commonly, include 32-by-32 elements corresponding to a 32-by-32 pixel color cursor.

Figure 3:
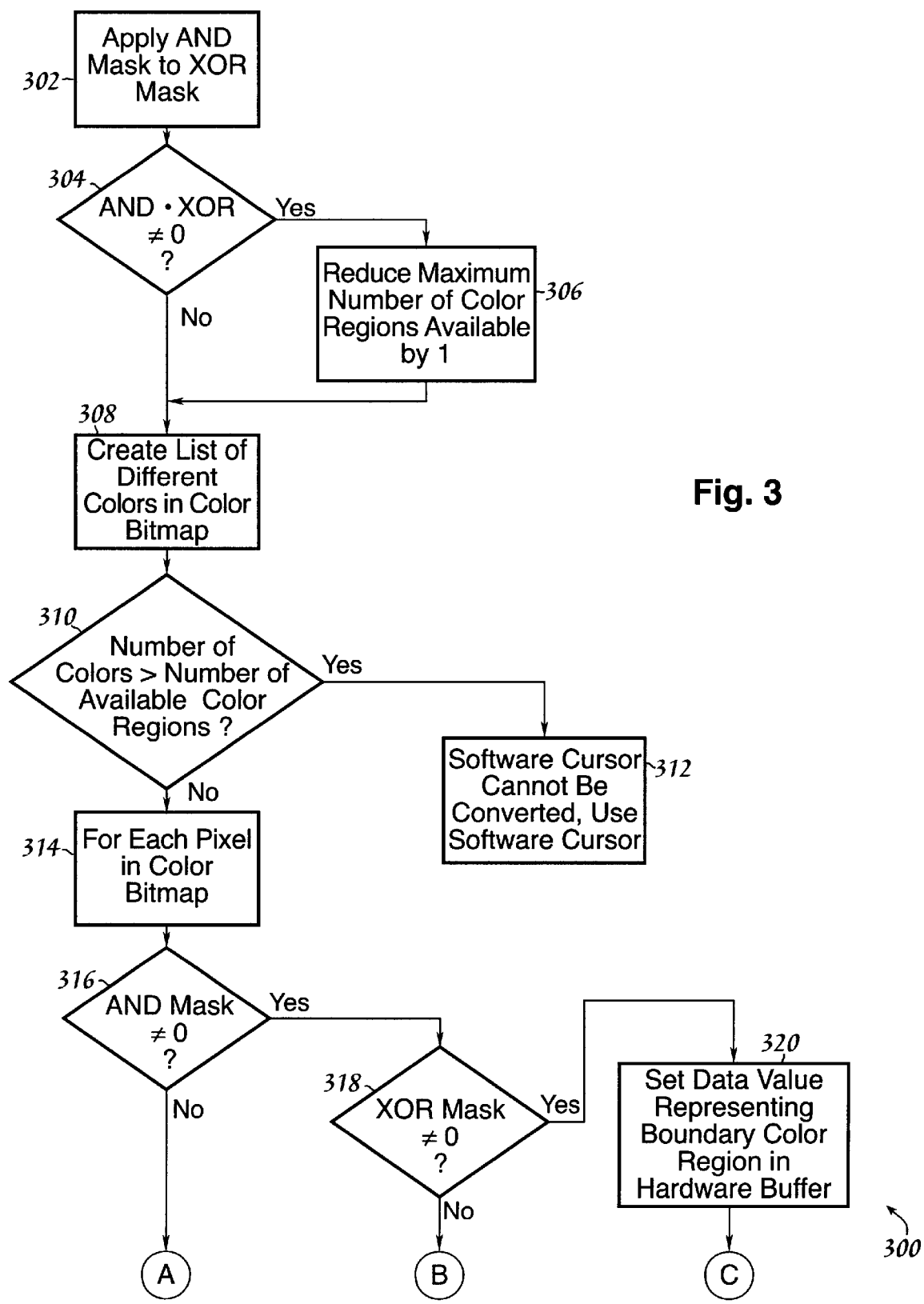
FIG. 3 illustrates, in flowchart form, a method of generating multicolor hardware cursors in accordance with an embodiment of the present invention.
Figure 3:
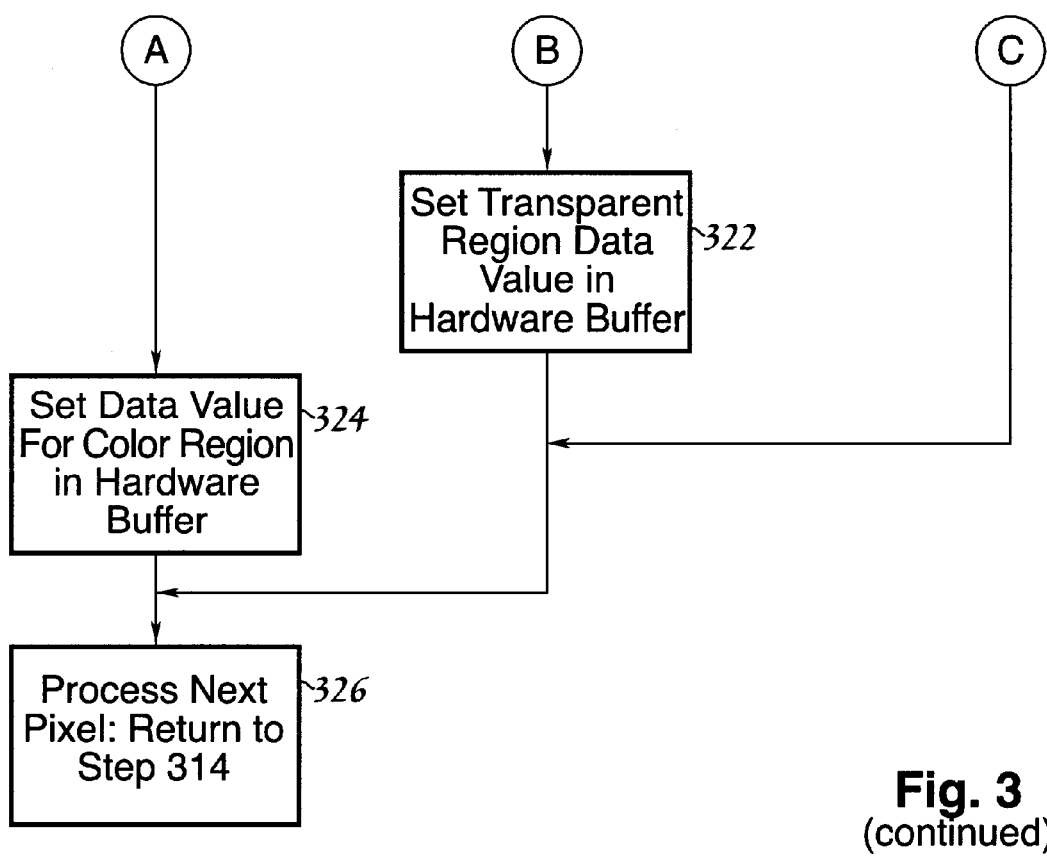

The two bitmasks, such as, bitmasks 202 and 210, and the color bitmap, such as, color bitmap 220, defining the software color cursors are used by the present invention to implement the cursor as a multicolor hardware sprite. Referring now to FIG. 3, there is illustrated therein a methodology 300 for dynamically converting software multicolor cursors to multicolor hardware sprites in accordance with the present invention.

Methodology 300 maps the software color cursor as defined by the AND, XOR, and color bitmaps into the video device supporting the multicolor sprites. The video device includes a buffer for storing data corresponding to the pixels forming the sprite, which may be M-by-N pixels wide. Each element of the video buffer includes a plurality, K, of bits. A number of different color regions which may be rendered in the hardware sprite equals $2^K$. One color region may be a "transparent" region whereby the background is displayed through the multicolor sprite. Additionally, the video device includes a plurality of color registers, each of which corresponds to one of the color regions. Thus, in a video device having a video buffer that is K bits deep, there are correspondingly $2^K$ color registers for receiving a color data value representing the color of the corresponding region in the sprite.

Methodology 300 initiates by applying the AND bitmask to the XOR bitmask. In step 304, the elements resulting from step 302 are tested to determine if the element contains a value that is not equal to "0", or other predetermined value denoting that the element has been reset. If, in step 304, the resulting data structure (denoted AND•XOR in FIG. 3) contains at least one element that has been set, in step 306 a maximum number of available color regions supported by the hardware sprite is reduced by one, thereby reserving a color region for a cursor boundary, in step 320, below. Otherwise, if in step 304, all elements resulting from step 302 are reset, the number of available color regions supported by the hardware sprite is left unchanged.

In step 308, the number of different colors contained in the color bitmap are counted and a list of the unique colors created. In step 310, it is determined if the number of colors in the color bitmap, determined in step 308, exceeds the number of available color regions. The number of color regions available is either the maximum number of color regions supported by the hardware sprite, or if, step 306 has been executed, one less than the maximum number of color regions supported by the hardware sprite.

If, in step 310, the number of colors in the software cursor exceeds the number available in the hardware sprite, then in step 312, the software cursor cannot be converted, and is then used to generate the cursor displayed on the display device.

However, if the number of colors in the color bitmap does not exceed the number of colors available, then the hardware sprite may be used to generate the color cursor. Then, in step 314, a loop over pixels in the color bitmap is entered. For each pixel in the color bitmap, a corresponding element in the AND mask is tested, in step 316. If the corresponding element is equal to "1" or other predetermined data value indicating that the element is set, then in step 318 the corresponding element of the XOR mask is tested. If that element is set, then, in step 320, a data value representing a boundary color region is set in the hardware buffer at the element corresponding to the current pixel in the color bitmap. If, however, in step 318, the element in the XOR mask has been reset, which may in an embodiment of the present invention correspond to a bit equal to "0", then the data value representing a transparent region is set in the hardware buffer at the element corresponding to the current pixel in the color bitmap, step 322.

However, if in step 316, the element of the AND bitmask was reset, then the data value for the color region represented by the current pixel in the color bitmap is set in the hardware buffer, step 324. Methodology 300 then loops to the next color pixel, in step 326 by returning to step 314.

In this way, a mechanism for the dynamic conversion of multicolor software cursors to a hardware cursor via a multicolor hardware sprite is provided. The software color cursor definitions are mapped into the video device supporting the hardware supporting multicolor sprites. In this way, the software cursor is used to generate the hardware cursor without the need for any new software interfaces.

Although the present invention and its advantages have been described in detail, it should be understood that various changes, substitutions and alterations can be made herein without departing from the spirit and scope of the invention as defined by the appended claims.

What is claimed is:

1. A method of hardware color cursor generation comprising the steps of:
   if a number of different colors in a color data structure does not exceed a number of available color regions in a hardware sprite:
   for a current pixel:
   determining if a corresponding element of a second data structure has a first predetermined value; and
   if said corresponding element of said second data structure has said first predetermined value, setting a data value from said color data structure for said current pixel in a buffer in said hardware sprite, wherein said data is stored in a buffer element corresponding to said current pixel, and corresponding to a color region for a color represented by said data value.

2. The method of claim 1 wherein said color data structure comprises a color bitmap, and said second data structure comprises an AND bitmask.

3. The method of claim 1 further comprising the steps of:
   applying said second data structure to a third data structure; and
   if at least one element resulting from said applying step has a second predetermined value, reducing said number of available color regions by one.

4. The method of claim 1 further comprising the steps of:
   for said current pixel:
   if a corresponding element of a third data structure has a second predetermined value, bypassing the step of setting said data value from said color data structure for said current pixel in said buffer in said hardware sprite; and setting a data value corresponding to a transparent region in said buffer element in the hardware sprite corresponding to said current pixel.

5. The method of claim 4 wherein said third data structure comprises an XOR bitmask, and said second predetermined value is a complement of said first predetermined data value.

6. The method of claim 1 further comprising the steps of:
for said current pixel:
if a corresponding element of a third data structure has a fourth predetermined value, bypassing the step of setting said data value from said color data structure for said current pixel in said buffer in said hardware sprite; and
setting a data value corresponding to a boundary color region in said buffer element in the hardware sprite corresponding to said current pixel.

7. The method of claim 6 wherein said third data structure comprises an XOR bitmask, and said fourth predetermined value comprises said first predetermined data value.

8. The method of claim 1 further comprising, for each pixel, repeating the steps of:
determining if a corresponding element of a second data structure has a first predetermined value; and
if said corresponding element of said second data structure has said first predetermined value, setting a data value from said color data structure for said current pixel in a buffer in said hardware sprite, wherein said data stored in a buffer element corresponding to said current pixel, and corresponding to a color region for a color represented by said data value.

9. A data processing system comprising:
circuitry operable for, if a number of different colors in a color data structure does not exceed a number of available color regions in a hardware sprite:
for a current pixel:
determining if a corresponding element of a second data structure has a first predetermined value; and
if said corresponding element of said second data structure has said first predetermined value, setting a data value from said color data structure for said current pixel in a buffer in said hardware sprite, wherein said data is stored in a buffer element corresponding to said current pixel, and corresponding to a color region for a color represented by said data value.

10. The system of claim 9 wherein said color data structure comprises a color bitmap, and said second data structure comprises an AND bitmask.

11. The system of claim 9 further comprising:
circuitry operable for applying said second data structure to a third data structure; and
circuitry operable for, if at least one element resulting from said applying step has a second predetermined value, reducing said number of available color regions by one.

12. The system of claim 9 further comprising:
circuitry operable for, for said current pixel:
if a corresponding element of a third data structure has a second predetermined value, bypassing the step of setting said data value from said color data structure for said current pixel in said buffer in said hardware sprite; and
setting a data value corresponding to a transparent region in said buffer element in the hardware sprite corresponding to said current pixel.

13. The system of claim 12 wherein said third data structure comprises an XOR bitmask, and said second predetermined value is a complement of said first predetermined data value.

14. The system of claim 9 further comprising:
circuitry operable for, for said current pixel:
if a corresponding element of a third data structure has a fourth predetermined value, bypassing the step of setting said data value from said color data structure for said current pixel in said buffer in said hardware sprite; and
setting a data value corresponding to a boundary color region in said buffer element in the hardware sprite corresponding to said current pixel.

15. The system of claim 14 wherein said third data structure comprises an XOR bitmask, and said fourth predetermined value comprises said first predetermined data value.

16. The system of claim 9 further comprising, for each pixel, circuitry operable for repeating the determining if a corresponding element of a second data structure has a first predetermined value, and if said corresponding element of said second data structure has said first predetermined value, setting a data value from said color data structure for said current pixel in a buffer in said hardware sprite, wherein said data stored in a buffer element corresponding to said current pixel, and corresponding to a color region for a color represented by said data value.

17. A computer program product embodied in a machine readable storage medium, the program product including programming for hardware color cursor generation, the programming including a program of instructions for performing the steps of:
if a number of different colors in a color data structure does not exceed a number of available color regions in a hardware sprite:
for a current pixel:
determining if a corresponding element of a second data structure has a first predetermined value; and
if said corresponding element of said second data structure has said first predetermined value, setting a data value from said color data structure for said current pixel in a buffer in said hardware sprite, wherein said data is stored in a buffer element corresponding to said current pixel, and corresponding to a color region for a color represented by said data value.

18. The program product of claim 17 wherein said color data structure comprises a color bitmap, and said second data structure comprises an AND bitmask.

19. The program product of claim 17 further comprising program instructions for performing the steps of:
applying said second data structure to a third data structure; and
if at least one element resulting from said applying step has a second predetermined value, reducing said number of available color regions by one.

20. The program product of claim 17 further comprising program instructions for performing the steps of:
for said current pixel:
if a corresponding element of a third data structure has a second predetermined value, bypassing the step of setting said data value from said color data structure for said current pixel in said buffer in said hardware sprite; and setting a data value corresponding to a transparent region in said buffer element in the hardware sprite corresponding to said current pixel.

21. The program product of claim 20 wherein said third data structure comprises an XOR bitmask, and said second predetermined value is a complement of said first predetermined data value.

22. The program product of claim 17 further comprising program instructions for performing the steps of:

for said current pixel:
- if a corresponding element of a third data structure has a fourth predetermined value, bypassing the step of setting said data value from said color data structure for said current pixel in said buffer in said hardware sprite; and
- setting a data value corresponding to a boundary color region in said buffer element in the hardware sprite corresponding to said current pixel.

23. The program product of claim 22 wherein said third data structure comprises an XOR bitmask, and said fourth predetermined value comprises said first predetermined data value.

24. The program product of claim 17 further comprising, for each pixel, program instructions for performing the step of repeating the steps of:

- determining if a corresponding element of a second data structure has a first predetermined value; and
- if said corresponding element of said second data structure has said first predetermined value, setting a data value from said color data structure for said current pixel in a buffer in said hardware sprite, wherein said data stored in a buffer element corresponding to said current pixel, and corresponding to a color region for a color represented by said data value.

\* \* \* \* \*

UNITED STATES PATENT AND TRADEMARK OFFICE
CERTIFICATE OF CORRECTION

PATENT NO.    : 6,337,701 B1
DATED         : January 8, 2002
INVENTOR(S)   : Scott Thomas Jones It is certified that error appears in the above-identified patent and that said Letters Patent is hereby corrected as shown below:

<u>Column 4,</u>
Line 56, replace "2P" with -- $2^P$ --.

Signed and Sealed this

Fourth Day of June, 2002

*Attest:*

*Attesting Officer*

JAMES E. ROGAN
*Director of the United States Patent and Trademark Office*